United States Patent [19]

Fraser

[11] 4,063,744
[45] Dec. 20, 1977

[54] COLLAPSIBLE CAMP PACK AND GAME CARRIER

[76] Inventor: Charles D. Fraser, 13121 W. Florida Drive, Lakewood, Colo. 80228

[21] Appl. No.: 696,392

[22] Filed: June 15, 1976

[51] Int. Cl.$^2$ .................................................. B62B 1/12
[52] U.S. Cl. .............................. 280/42; 280/47.37 R; 280/655
[58] Field of Search ................. 280/42, 651, 652, 653, 280/655, 47.3, 47.31, 639, 659, 47.37 R, 644

[56] References Cited

U.S. PATENT DOCUMENTS

| 704,426 | 7/1902 | Allen | 280/42 X |
|---|---|---|---|
| 1,052,953 | 2/1913 | Pierce | 280/47.31 X |
| 2,416,492 | 2/1947 | Neely | 280/47.3 |
| 2,429,028 | 10/1947 | Neely | 280/47.3 X |
| 2,624,588 | 1/1953 | Jones | 280/47.3 X |
| 2,636,748 | 4/1953 | Giovannoni | 280/47.3 |
| 2,660,446 | 11/1953 | Edhardt | 280/653 |
| 2,918,296 | 12/1959 | Goodale | 280/645 |
| 2,979,338 | 4/1961 | Dwyer | 280/47.3 |
| 2,992,834 | 7/1961 | Tidwell et al. | 280/47.3 |
| 3,456,959 | 7/1969 | Hemphill et al. | 280/47.3 |
| 3,936,069 | 2/1976 | Giordani | 280/644 |

FOREIGN PATENT DOCUMENTS

254,710  6/1967  Austria ................................. 280/47.3

*Primary Examiner*—Joseph F. Peters, Jr.
*Assistant Examiner*—Michael J. Forman
*Attorney, Agent, or Firm*—Clarence A. O'Brien; Harvey B. Jacobson

[57] ABSTRACT

A collapsible one-wheeled vehicle with removable and adjustable handlebars on each end thereof to allow two people to transport heavy loads over rough terrain. The vehicle utilizes a relatively large single wheel with brakes for handling ease when used in rough areas. The handlebars rotate relative to the frame about central pivot points on said frame in order to adjust the handlebars to different heights and widths, and are locked in place by three meshing gears. The handlebars may also be removed and placed in a storage position when not in use. The carrier has a folding platform that can be used to carry camp gear or irregular shaped objects when extended, or when folded the device may carry game or back packers' pack frames. The carrier is relatively light in weight, being approximatey 45 pounds, and can easily carry a 300 pound load.

9 Claims, 7 Drawing Figures

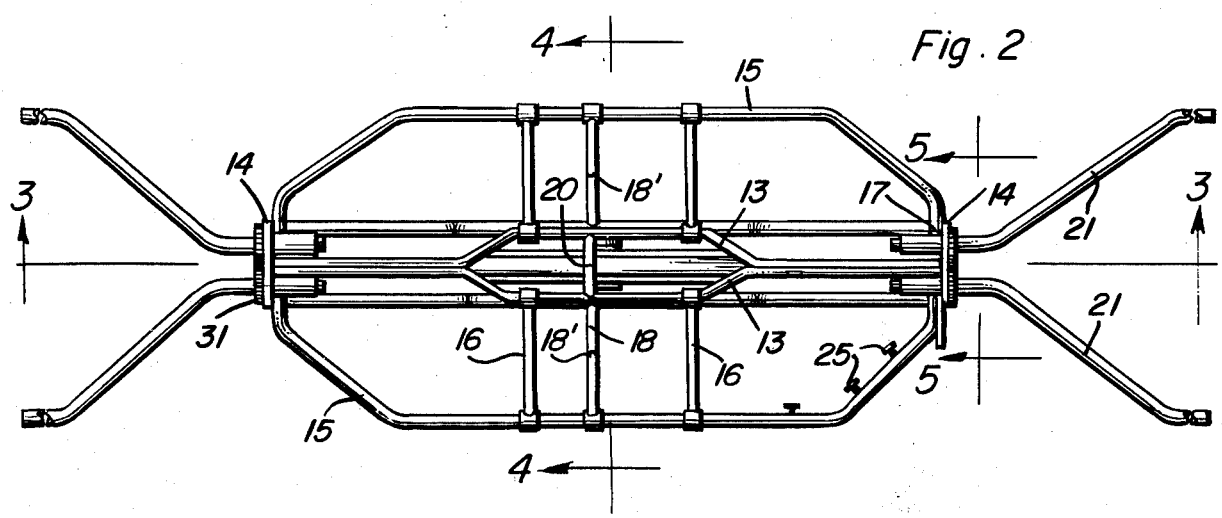
Fig. 2
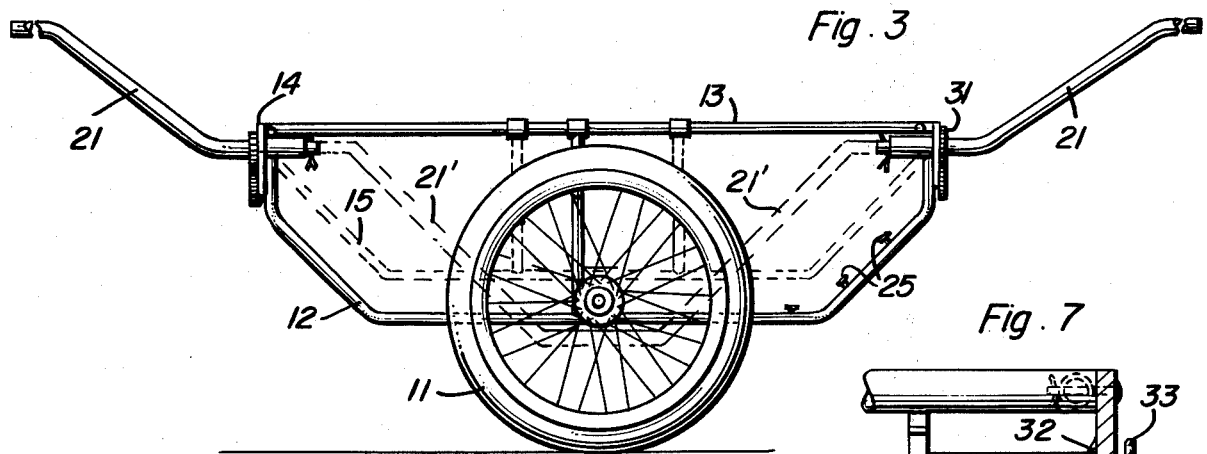
Fig. 3
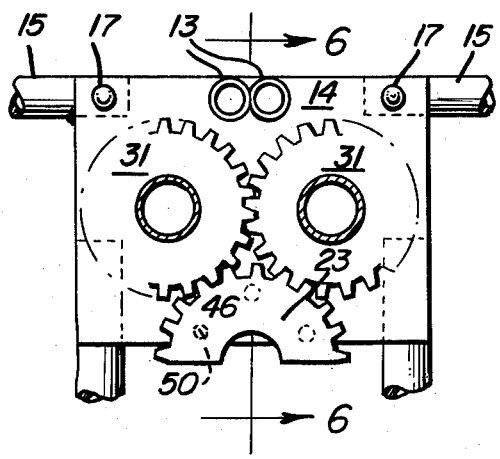
Fig. 5
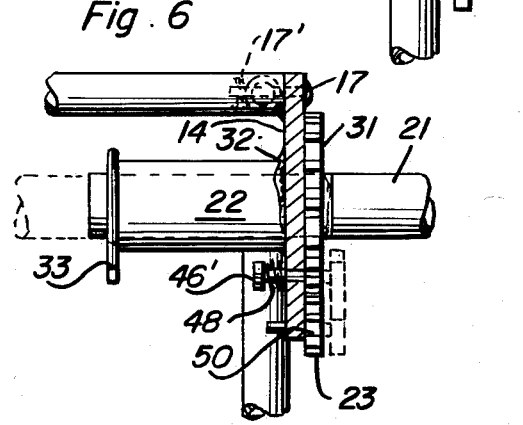
Fig. 6
Fig. 7

COLLAPSIBLE CAMP PACK AND GAME CARRIER

BACKGROUND OF THE INVENTION

1. Field of the Invention

This invention relates generally to devices for carrying camping gear and game as shot by hunters to and from remote areas.

2. Description of the Prior Art

A common problem with known devices for carrying camping gear and game of the wheel-type is that they generally have a relatively high center of gravity. This makes the overall device awkward and fairly unsafe to use. Also such high center of gravity devices are quite difficult to handle and quickly tire out the operators and users thereof.

Another known problem of prior devices are that while they may fold or partially collapse, the arrangement to permit this often times is quite complicated and difficult to use and operate.

A further disadvantage of known devices having handlebar gripping structures are that such handlebar gripping portions are not adjustable for the respective heights of the user/operators. This means that if a person using the devices is other than of average size, it is very awkward and difficult for him to use.

Known prior art patent which may be pertinent to this invention are as follows: U.S. Pat. Nos. 704,426, 2,979,338, 2,918,296, 2,636,748, 2,429,028 and 2,416,492.

None of these prior art devices offers the new and unique features of the invention disclosed herein.

SUMMARY OF THE INVENTION

An object of the present invention is to provide a camp and game carrier to permit hunters and campers to carry food and equipment to remote areas and to permit hunters to retrive game they have killed without using motorized vehicles.

Another object of the present invention is to provide a carrier device having a relatively low center of gravity and employing a single large diameter wheel to make travel over rough and difficult terrain relatively easy.

A further object of this invention is to provide a carrier device which is collapsible and also one which has foldable and adjustable handlebar structure. The adjustment of the handlebar structure is to permit the handlebars, when in the set-up and operating position, to be adjusted for the proper height of the user/operator in order to increase the ease and safety of the operator's handling of the overall device.

A still further object of this invention is to provide a camp and game carrier having removable handlebars at each end thereof, the purpose being to permit two operators to handle the set-up device, and with the handlebars being removable and storable within said collapsed device for easy portabillity, storage, and transportation of the device to and from the point of desired use. The handlebars are also adjustable in both height and width, and the overall device has a lower center of gravity to increase the safety and maneuverability of the device. A foldable platform is also part of the device which will permit camping gear and the like to be carried atop said platform when extended and in open position, and to allow game such as deer and the like to be draped over the frame of the device when the platform is collapsed. Also, when the platform is collapsed, backpacks for compers may be appropriately lashed to each side of the overall device.

This carrier may be used to carry food and equipment into remote areas by lashing said equipment to the extended platform as erected, or items such as pack frames to the device when the platform is collapsed and folded down by lashing the pack frames to the sides thereof. Six pack frames can be carried at one time in this manner. Also, big game such as deer, elk, etc. can be carried by draping the animal over the vehicle when the platform is folded. Appropriate lashing may be employed to secure the game to the carrier. When carried in this manner, the center of gravity is very low which makes the carrier much easier to maneuver on rough terrain by two operators, and even on occasion by a single operator.

The provision for two pairs of adjustable handlebars also greatly increases the safety, operator control, and maneuverability of the overall carrier device. The single relatively large diameter wheel also permits the carrier to traverse rough terrain and small ravines and ditches without difficulty. Appropriate braking mechanism is also associated with the wheel and controlled by at least one of the operators from his respective handlebars.

These together with other objects and advantages which will become subsequently apparent reside in the details of construction and operation as more full hereinafter described and claimed, reference being had to the accompanying drawings forming a part hereof, wherein like numerals refer to like parts throughout.

FIG. 2 is a top plan view of the carrier of this invention as open and ready for use.

FIG. 3 is a side elevational view taken generally along line 3—3 of FIG. 2.

FIG. 5 is an end view of the handlebar and adjustment gearing portion of the carrier as taken along line 5—5 of FIG. 2.

FIG. 6 is a side view of the handlebar gearing portion of the carrier as taken along 6—6 of FIG. 5. This figure shows the handlebar portions as assembled ready for use.

FIG. 7 is a side view of the handlebar gearing taken generally from the same position as the view of FIG. 6, but with the handlebars unassembled as in storage position.

DESCRIPTION OF THE PREFERRED EMBODIMENT

Figure 1:
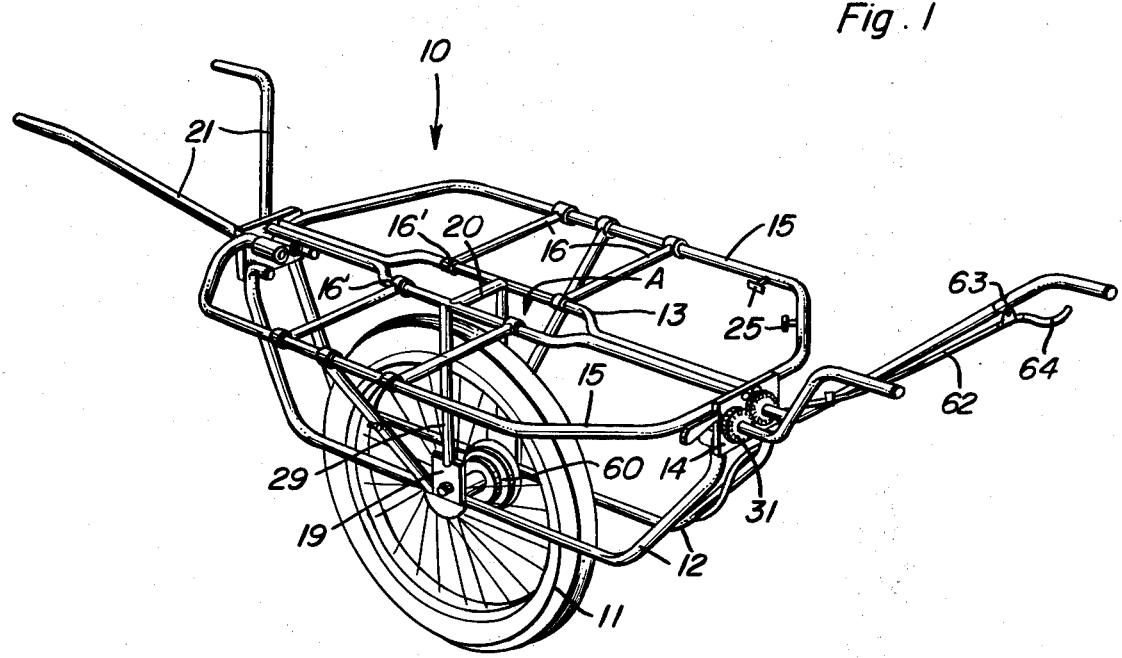
FIG. 1 is a perspective view of the camp pack and game carrier of this invention as open and ready for use.

Referring to FIG. 1 of the drawings, reference numeral 10 indicates in general the camp and game carrier device of this invention. As shown, in FIG. 1, it is open and ready for use with the handlebars assembled and adjusted for a person of average height. A single relative large diameter wheel 11 supports the device. A conventional axle with bearings and the like provide the mount for said wheel together with appropriate braking mechanism 60 as shown. The braking mechanism 60 may be of conventional drum-type, or of the newer disc-type, and is remotely operated by a cable 62 attached to a handle by means 63 and having an operating lever 64.

The main frame of the carrier includes lower longitudinal tubular members 12, whose mid-portion support axial spindle mounting blocks 19 thereon. The main frame also includes upper longitudinal tubular members 13 connected at corresponding ends to opposite end handlebar attachment plates 14. The tubular members 12, 13 are appropriately connected by welding or the like to the plates 14. Plates 14 provide the support mechanism for the adjustable and removaable handlebar structure. Upright support and strengthening members 29 are also provided between the wheel support brackets 19 and the middle center portion of the upper tubular member or frame rods 13. A transverse handle grip and lift bar 20 is also provided at the center of the upper frame portion 13 between the laterally spaced longitudinal mid-portions of the members 13, as best seen in FIG. 1. The steel tubing used for the frame members 12 and 13 may be of ⅜ inch diameter which has been found to be quite satisfactory in use. This size tubing has the necessary strength, but also is relatively light in weight which is also very important for the overall structure. Plates 14 may be of ⅛ inch thick steel plates of approximately 4 inches by 6 inches in size.

Figure 4:
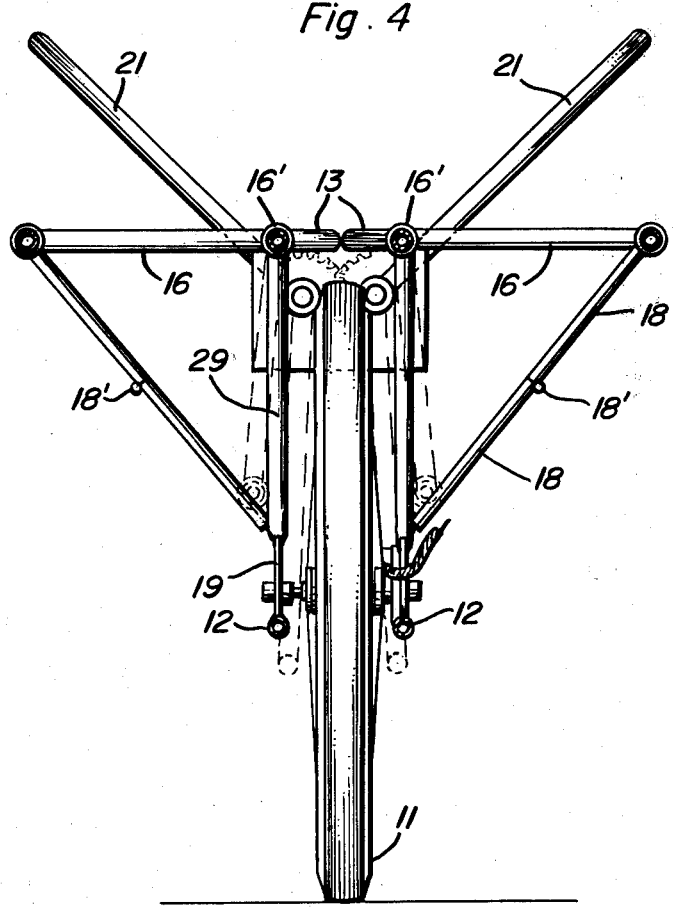
FIG. 4 is an end view taken generally along line 4—4 of FIG. 2.

Platform assemblies are provided for each side of the carrier which consists of tubular frames 15 and appropriate brace and support bars 16. As seen in FIGS. 5 and 6, a pivot pin 17 and retaining member 17' are appropriately provided for each of the end corners of the platform frame 15. These pivot pins 17 permit the platforms to be folded down in a collapsed position alongside the main frame portions 12 as well as allowing same to be erected to a horizontal platform-type position, as best seen in FIGS. 1 and 4. The inner end 16' of the support braces 16 are appropriately designed for pivotable movement around the associated portions of upper frame members 13.

FIGS. 1, 2 and 3 show the peg members 25 appropriately provided along the inner sides of the tubular members 12 and 15 for the purpose of forming line engaging hooks for strapping backpacks or other camping gear to the frames. While only a few of these T-headed pegs are shown, obviously they may be provided along most of the tubular surfaces. In order to maintain the platforms 15, 16 in the open position, as best seen in FIG. 4, folding braces 18 are provided having suitable hinged middle connections 18'. The hinge 18' is preferably of the semi-locking type which will require positive unlocking and disengagement by a user in order to fold and collapse the support member 18. Any of the conventional well-known type semi-locking hinge structures may be employed at this point.

As can be readily visualized by viewing the drawing figures the relatively large diameter single wheel 11, and the point of attachment of the single axle to the support plates 19 relative to the rest of the support frame structure it is apparent that the overall center of gravity of the device is relatively low. This produces one of the very desirable benefits of the device in that a center of gravity of any load being carried on the device will also be relatively low and since the basic control point of the handlebar structure is fairly high and above the center of gravity, the users and operators of this device may easily control and maneuver it when fully loaded with up to 300 pounds total capacity.

Another important feature of this structure is in the removable and adjustable handle bar mechanism. All of the figures and especially FIGS. 5, 6 and 7, show this specific structure to be described in detail. The pairs of handle bar structures 21 are appropriately curved in typical handlebar fashion as seen in the various views of the drawing. The outer end portions are engageable by the hands of an operator/user and may appropriately be provided with rubber or plastic handlebar grips, as is conventional with bicycles and motorcycles, but not shown in the illustrations. The inner ends of the handlebars fit within tubular support projections 22, welded by suitable welding 32, to the inner sides of plates 14, best seen in FIGS. 6 and 7. As shown in FIG. 6, the extreme end of the assembled handlebar 21 projects beyond the tubular support 22 and has a locking pin 33 appropriately placed thereon to retain the handlebars 21 in the assembled position. Welded to the handlebars approximately 6 inches from the tip end thereof are gears 31. These gears 31 intermesh, with each other, as seen in FIG. 5, and also intermesh with a locking gear 23. Said locking gear 23 will positively retain the handle bars 21 as adjusted, prior to use of the carrier, for both the desired height and width. The locking gear segment 23 has pins 50 provided thereon which engage with corresponding apertures in the plate 14. Also, a third center guide pin 46 is provided with an enlarged retaining head 46' at the inner end thereof and a bias spring 48 is mounted between said enlarged head 46' and the inner surface of the plate 14. Thus, the bias spring 48 will retain the half segment gear member 23 normally against the outside of the plate 14. In this retained biased position the gear segment 23 will lock the handlebar gears 31 in whatever position they are adjusted to. By merely pulling outwardly on the segment 23 against the bias of spring member 48 the handlebars may be adjusted relative to each other outwardly and downwardly, or upwardly and inwardly, for the respective position as desired by a user/operator of the device. Once properly positioned the segment 23 will be allowed to spring back against the plate 14 to lock the gears 31 in the adjusted position. This is a very simple, easy to adjust mechanism, positive in locking action, and with extremely low maintenance requirements.

FIG. 7 shows the handle bar structure as in unassembled and folded position. The pin member 33 is merely removed from the inner end of the handlebar structure 21, as shown in the assembled position of FIG. 6, and then the attached gear 31 and handlebars 21 are placed inside of the framework and reinserted into the tubular projecting member 22 from the opposite side thereof. When the gear 31 hits the inner end of the member 22 the locking member 33 is reinserted on the extreme end of handlebar 21, as seen in FIG. 7. The handlebar is then locked and retained in the collapsed position. FIG. 3 depicts this collapsed position by the showing of the handlebar structure in dotted lines and referenced by numeral 21'.

From the above description one can readily visualize how this camp and game carrier device may be easily collapsed for carrying in the trunk of a car, the back portion of a van, the wagon bed of a truck, and the like, and then once reaching the desired camp site or camp area, quickly assembled to the usable position. By adjusting the height and width of the handlebar structure with the positive locking gear structure as described, the user/operators of the carrier will be able to maneuver the overall structure, even though fully loaded with ease and safety. Also, since the handlebar adjustment is simple and quick, it may be made and changed in the field, if operators of different sizes take turns using the device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A collapsible camp pack and game carrier, said carrier including a narrow elongated longitudinal frame provided with dependingly supported wheel support structure centrally intermediate the opposite ends of said frame from whose lower portion a large diameter ground engageable wheel is journalled for rotation about a horizontal transverse axis, mounting means on at least one end of said frame, a pair of elongated handlebars for each mounting means, said handlebars each including relatively laterally offset opposite end portions support means rotatably supporting one pair of corresponding end portions of said handlebars from said mounting means for independent angular displacement relative to the latter about axes extending longitudinally of said frame and thus orbital displacement of the other pair of handlebar end portions about said axes, connecting means interconnecting said handlebars for simultaneous equal and opposite angular displacement relative to said frame, and releasable lock means operative to lock said handlebars in and against angular displacement out of adjusted portions relative to said frame.

2. The combination of claim 1 wherein said connecting means includes means operative to interconnect said handlebars for equal and opposite angular displacement relative to said frame with said handlebars variously adjustably angularly displaced relative to each other.

3. The combination of claim 1 wherein said frame includes inwardly and downwardly retractable horizontally outwardly projecting opposite side support frame portions.

4. The combination of claim 3 wherein said frame and frame portions include means supporting the latter from the former for swinging about horizontal axes extending longitudinally of said frame between horizontally outwardly projecting operative positions and downwardly depending retracted inoperative positions.

5. The combination of claim 4 wherein said main frame includes a pair of opposite side upper longitudinal members, said dependingly supported lower wheel support structure including a pair of transversely spaced depending wheel mounting members dependingly supported from longitudinal mid-portions of said upper longitudinal members, said wheel being journalled between the lower ends of said wheel mounting members.

6. A collapsible camp pack and game carrier, said carrier including a narrow elongated longitudinal frame, provided with dependingly supported wheel support structure centrally intermediate the opposite ends of said frame from whose lower portion a large diameter ground engageable wheel is journalled for rotation about a horizontal transverse axis, mounting means on at least one end of said frame, a pair of elongated handlebars for each mounting means, said handlebars each including relatively laterally offset opposite end portions, support means rotatably supporting one pair of corresponding end portions of said handlebars from said mounting means for independent angular displacement relative to the latter about axes extending longitudinally of said frame and thus orbital displacement of the other pair of handlebar end portions about said axes, said other pair of handlebar end portions defining elongated handgrips extending longitudinally of said frame, and releasable means operative to lock said handlebars in and against angular displacement out of adjusted positions relative to said frame, the axes of angular displacement of said handlebars relative to said main frame being closely spaced apart transversely of the latter.

7. The combination of claim 6 wherein said frame includes inwardly and downwardly retractable horizontally outwardly projecting opposite side support frame portions.

8. The combination of claim 7 wherein said frame and frame portions include means supporting the latter from the former for swinging about horizontal axes extending longitudinally of said frame between horizontally outwardly projecting operative positions and downwardly depending retracted inoperative positions.

9. The combination of claim 6 wherein each end of said frame includes mounting means and a pair of handlebars supported therefrom and also releasable lock means operative to lock the corresponding handlebars in and against angular displacement out of adjusted positions relative to said frame.

* * * * *